United States Patent Office 3,562,318
Patented Feb. 9, 1971

3,562,318
CATALYTIC OXIDATION PROCESS OF
MONO-ARYL COMPOUNDS
Bruno J. Barone, Houston, and Louis J. Croce, Seabrook, Tex., assignors to Petro-Tex Chemical Corporation, Houston, Tex., a corporation of Delaware
No Drawing. Continuation-in-part of application Ser. No. 598,140, Nov. 10, 1966. This application Dec. 1, 1966, Ser. No. 598,172
Int. Cl. C07c 63/02
U.S. Cl. 260—524
11 Claims

ABSTRACT OF THE DISCLOSURE

Oxidation of aromatic compounds such as p-xylene to acids such as terephthalic acid under controlled reaction conditions and in the presence of a methylenic ketone or aldehyde and as a catalyst a combination of cobalt and at least one ion of a metallic element having a valence of greater than +1 but having only a single valence.

This application is a continuation-in-part of our application Ser. No. 598,140, filed Nov. 10, 1966, now abandoned.

This invention relates to the oxidation of aromatic compounds characterized by a single aryl group having at least one methyl nuclear substituent. More particularly, the invention relates to an improved process for the efficient and economical conversion of suitable methyl and dimethyl-substituted mono aryl compounds to aromatic monobasic and dibasic acids.

Earlier studies in this field have evolved a variety of proposed processes for the catalytic liquid phase oxidation of alkylated aromatic compounds, in the presence or absence of a solvent, by means of air or oxygen using various metals or salts thereof as catalysts. A number of classes or organic compounds, such as peroxides, aldehydes, and ketones have been proposed and utilized as reaction initiators or activators.

In general, many prior art processes involve inherent disadvantages, the principal defect being the conversion of only a small fraction, usually much less than half, of the feedstock even after lengthly reaction periods. Additional problems are the simultaneous formation of other oxidized products, the removal of which may be difficult and requires additional steps and expense; the requirement for reaction conditions involving high temperature or high pressure or both; and the use of additional reagents which increases the cost of production. Where the desired product was a dibasic acid, the prior art process generally required successive steps, as for example, first the conversion of xylene to toluic acid and then the oxidation of the latter under more drastic conditions to the corresponding dibasic acid.

The present invention has for its principal object the provision of a novel process for the economical and efficient conversion of aromatic compounds to useful oxidation products such as toluic acid, terephthalic acid, and various other compounds. A further object is to provide a method whereby methyl and dimethyl substituted benzenes may be directly oxidized to the desired products without the necessity of going through intermediate steps. A still further object is to provide a method of carrying out such oxidations under relatively mild temperature conditions at either ordinary or super-atmospheric pressure so as to produce good yields of the desired oxidation products. Further objects include the provision of such a process which goes to completion quickly and which also results in high yields of excellent product; which yields directly products of high purity or having a small content of readily separable impurities; and which involves reaction conditions that are operable at low cost and readily controlled.

The above and other objects are accomplished in accordance with this invention by carrying out the reaction with the materials and the operating conditions hereinafter described.

Broadly, the invention comprises reacting a methyl or dimethyl substituted mono-aryl compound in an alkanoic acid of 2 to 4 carbon atoms, at a concentration of 0.3 to 2 molar, with oxygen at a temperature of from 70° C. to 150° C. at atmospheric pressure or greater, and in the presence of from 0.3 to 24 grams per liter cobaltous or cobaltic ion, or mixtures thereof, 0.05 to 9.5 grams per liter of a metal ion co-catalyst, as more particularly hereinafter described, and 0.1 to 0.5 mole per liter of an initiator comprising or consisting of a methylenic ketone or an aldehyde. Typical starting materials are methyl or dimethyl substituted benzenes such as toluene, m-xylene, p-xylene, or mixtures containing such compounds. The aromatic starting material may contain, in addition to a methyl group or groups, other nuclear substituents inert to the oxidation reaction, such as chlorine, bromine, fluorine, nitro, carboxyl, alkoxy, aryloxy, or tertiary alkyl groups. Typical conversions include toluene to benzoic acid, m-xylene or m-toluic acid to isophthalic acid, p-xylene or p-toluic acid to terephthalic acid, 1,4-dimethyl-2-chlorobenzene to chloroterephthalic acid, and 1,4-dimethyl-2-nitrobenzene to nitroterephthalic acid. Additional conversions attainable by the present invention include conversion of terephthaldehyde and p-tolualdehyde to terephthalic acid, isophthalic aldehyde to isothalic acid, and benzaldehyde to benzoic acid.

As noted above, either cobaltous or cobaltic ion (or both) must be present in amount corresponding to the initial provision of a cobalt salt soluble in the above solution, such as cobaltous acetate, propionate, or butyrate, to the extent of about 0.3 to 24 grams of cobaltous or cobaltic ions per liter of solution, although an amount of from about 0.4 to 15 grams is preferred. Thus, with the use of a 1 molar solution of the starting aromatic compound in acetic acid, the desired catalyst concentration may be supplied by the initial provision of about 0.03 to 0.20 mole of cobaltous acetate per liter of solution. Examples of cobaltous compounds which may be utilized are $Co(OAC)_2 \cdot 4H_2O$, cobaltous chloride, cobaltous acetylacetonate, etc., while cobaltic compounds are exemplified by cobaltic acetylacetonate and cobaltic acetate.

A small amount of water is preferred in the system, e.g., 0.001 to 0.02 mole, in order to reduce the induction period and to insure complete solubility of the cobalt compound. Water need not be used with acetylacetonates. The water may be introduced directly or by the use of hydrated materials; however, excess water kills the reaction.

Suitable temperatures for the oxidation process in accordance with this invention are within the range of 70° C. to about 120° C. at atmospheric pressure, although temperatures up to about 150° C. may at times be used with somewhat higher pressures up to about 50 atmospheres. The preferred operating temperatures are within the range of 80° C. to 110° C.

While air is the most economical source of oxygen, any suitable oxygen-containing gas such as pure oxygen, ozone, or mixtures of such gases with inert gaseous diluents may be employed. It will, of course, be understood that in oxidizing substituted aromatic compounds in accordance with the invention, the oxygen supplied by continuous introduction of air or other oxygen-containing gas, as explained above, is the fundamental source of oxygen for the oxidation reaction, and sufficient oxygen must be supplied to complete the reaction.

It has been found that certain metallic elements are effective, in conjunction with the cobaltous or cobaltic ions, in improving the yields and/or rates of the reaction. In general, the metals of the Periodic Table having a valence greater than 1+, but having only a single valence state, are effective in accomplishing increased yields and faster reaction rates. Exemplary are Be, Mg, Ca, Sr, Ba, Sc, Y, La, Zr, Hf, Ac, Ta, Mo, W, Ru, Rh, Cd, Zn, B, Al, Ga, In, Nd, Pr, Gd, Tb, and Th and mixtures thereof. Especially effective are Al, Zr, La, Nd, Zn, B and Mg. These elements, or mixtures thereof, may be in the form of salts, oxides, hydrooxides and complexes, the only requirement being that sufficient amounts of the specified elements be present to provide a catalytic amount of ions in the solution during the course of the reaction. For example, the metal ions may be added in the form of compounds or complexes such as the oxalates, the acetylacetonates, the alcoholates, the chlorides, the octoates, acetylacetates and the like. Salts of the lower fatty acids are especially useful, e.g., the acetates, propionates, and butyrates. As noted previously, the metals should be present in amount of from 0.5 to 9.5 grams per liter. A preferred amount is from 0.5 to 4.9 grams per liter.

Suitable acid media for carrying out the reaction in the range set forth, as noted previously, are the alkanoic acids of 2 to 4 carbons. While acetic acid is preferred, propionic, butyric, trimethyl acetic and isobutyric, such aromatic acids as phenyl acetic, and such hydroxy acids or derivatives as methoxy acetic, and the like may be used.

A significant feature of the invention is the employment of an initiator to aid in the attack on the hydrocarbon molecule, especially at lower temperatures. The preferred initiators are paraldehyde and methyl ethyl ketone; however, other similar aldehydes and ketones may be utilized. For example, the aldehydes acetaldehyde, propionaldehyde, tolualdehyde and isobutyraldehyde, and the ketones diethyl ketone, methyl propyl ketone, and 2,5 hexanedione may be used. As indicated previously, the initiator is present in an amount of from 0.1 to 0.5 mole per liter of solution.

EXAMPLE I

An acetic acid solution containing 1.0 moles per liter p-xylene, 5.9 grams per liter cobaltous ion as cobalt acetate-tetrahydrate, 2.3 grams per liter zirconium ion as zirconium acetate, and 0.2 mole per liter methyl ethyl ketone was charged into a reactor provided with suitably valved gas inlet and outlet lines for admission of oxygen. The temperature of the reactor was held at 90° C. and the reaction carried out under atmospheric pressure. As a matter of convenience, the reaction was carried out for 24 hours, although it was clear that the bulk of the oxidation had been completed by ten to twelve hours of operation. The amount of p-xylene oxidized was 100 percent of that employed and gave a terephthalic acid yield of 98.5 percent.

EXAMPLE II

The procedure of Example I was repeated utilizing 5.2 grams per liter of bismuth ion as bismuth napthenate instead of Zr ion. Results showed 99.4 percent of the p-xylene was consumed to give yields of 64.3 percent p-toluic acid and 34.7 percent terephthalic acid respectively.

EXAMPLE III

The procedure of Example I was repeated except that 3.6 grams per liter of neodymium ion as neodymium acetate was used instead of the Zr ion. Conversion of p-xylene was 99.5 percent for a yield of terephthalic acid of 98.5 percent.

EXAMPLE IV

The procedure of Example I was repeated except that 0.64 gram per liter of aluminum as the acetyl acetonate was substituted for the Zr ion. The conversion of p-xylene was 99.5 percent for a terephthalic acid yield of 98.5 percent.

EXAMPLE V

The procedure of Example I was repeated except that instead of a cobaltous salt, a cobaltic salt was used, i.e., cobalt acetylacetonate. The amount of the zirconium acetate was also increased to 4.6 grams per liter, and 0.067 mole per liter paraldehyde was substituted for the methyl ethyl ketone. Conversion of the p-xylene was 100 percent for a terephthalic acid yield of 98 percent.

EXAMPLE VI

The procedure of Example V was repeated except that the amount of paraldehyde was increased to 0.134 mole per liter, the pressure raised to 500 p.s.i., and the temperature was increased to 100° C. At the end of 6½ hours, the conversion of p-xylene was 99.4 percent to give a terephthalic acid yield of 90.3 percent. Thus, a significant decrease in length of reaction time was achieved.

The procedure of Example VI was repeated except that 0.2 mole per liter methyl ethyl ketone was used instead of the paraldehyde. At the end of 6 hours the reaction was stopped, and the yield of terephthalic acid at that point was 85.3 percent.

We claim:

1. A process for oxidizing mono aryl compounds having at least one methyl group comprising contacting in acetic acid 0.3 to 2 moles per liter of said mono aryl compound with oxygen, in the presence of from 0.3 to 24 grams per liter of a member selected from the group consisting of cobaltous ion, cobaltic ion, and mixtures thereof; 0.05 to 9.5 grams per liter of an ion or ions of metallic elements selected from the group consisting of Al, Zr, La, Nd, Zn, B, Mg, and mixtures thereof, and 0.1 to 0.5 mole per liter of an initiator comprising a methylenic ketone or an aldehyde, said contacting being carried out at a temperature of from 70° to 150° C. and a pressure of from 1 to 50 atmospheres.

2. The process of claim 1 wherein the monoaryl compound is p-xylene.

3. The process of claim 1 wherein there is present 0.001 to 0.02 mole per liter of water.

4. The process of claim 3 wherein the initiator is selected from the group consisting of paraldehyde and methyl ethyl ketone.

5. The process of claim 4 wherein the initiator is paraldehyde and the pressure is greater than atmospheric.

6. The process of claim 3 wherein the metallic element is zirconium.

7. The process of claim 5 wherein there is present 0.001 to 0.02 mole per liter of water.

8. A process for oxidizing mono aryl compounds having at least one methyl group comprising contacting in an alkanoic acid of 2 to 4 carbon atoms 0.3 to 2 moles per liter of said mono aryl compound with oxygen, in the presence of from 0.3 to 24 grams per liter of a member selected from the group consisting of cobaltous ion, cobaltic ion, and mixtures thereof; 0.05 to 9.5 grams per liter of an ion or ions of metallic elements selected from the group consisting of Al, Zr, La, Nd, Zn, B, Mg, and mixtures thereof, and 0.1 to 0.5 mole per liter of an initiator comprising a methylenic ketone or an aldehyde, said contacting being carried out at a temperature of from 70° to 150° C. and a pressure of from 1 to 50 atmospheres.

9. A process for oxidizing mono aryl compounds having at least one methyl group comprising contacting in acetic acid 0.3 to 2 moles per liter of said mono aryl compound with oxygen, in the presence of from 0.3 to 24 grams per liter of a member selected from the group consisting of cobaltous ion, cobaltic ion, and mixtures thereof: 0.5 to 9.5 grams per liter of an ion or ions of metallic elements selected from the group consisting of Al, Zr, La, Nd, Zn, B and Mg; and 0.1 to 0.5 mole per liter of an initiator comprising a methylenic ketone or an aldehyde, said contacting being carried out at a temperature of from 70° to 120° C. and a pressure of from 1 to 50 atmospheres.

10. The process of claim 9 wherein the metallic element is zirconium.

11. A process for oxidizing p-xylene to terephthalic acid comprising contacting in acetic acid 0.3 to 2 moles per liter of said p-xylene with oxygen, in the presence of from 0.4 to 15 grams per liter of a member selected from the group consisting of cobaltous ion, cobaltic ion, and mixtures thereof; 0.05 to 9.5 grams per liter of zirconium; and 0.1 to 0.5 mole per liter of an initiator comprising a methylenic ketone or an aldehyde, said contacting being carried out at a temperature of from 70° to 120° C. and a pressure of from 1 to 50 atmospheres.

References Cited

UNITED STATES PATENTS

| | | | |
|---|---|---|---|
| 2,245,528 | 6/1941 | Loder | 260—524 |
| 3,299,125 | 1/1964 | Ichikawa | 260—524 |

OTHER REFERENCES

Fieser et al., Organic Chemistry, 3rd ed., 1956, p. 200.

JAMES A. PATTEN, Primary Examiner

R. S. WEISSBERG, Assistant Examiner